Aug. 2, 1927.

H. BUSSEY 1,637,601

SPREADER

Filed May 10. 1926

Inventor
Hugh Bussey

By Clarence A. O'Brien
Attorney

Aug. 2, 1927.
H. BUSSEY
1,637,601
SPREADER
Filed May 10, 1926
2 Sheets-Sheet 2
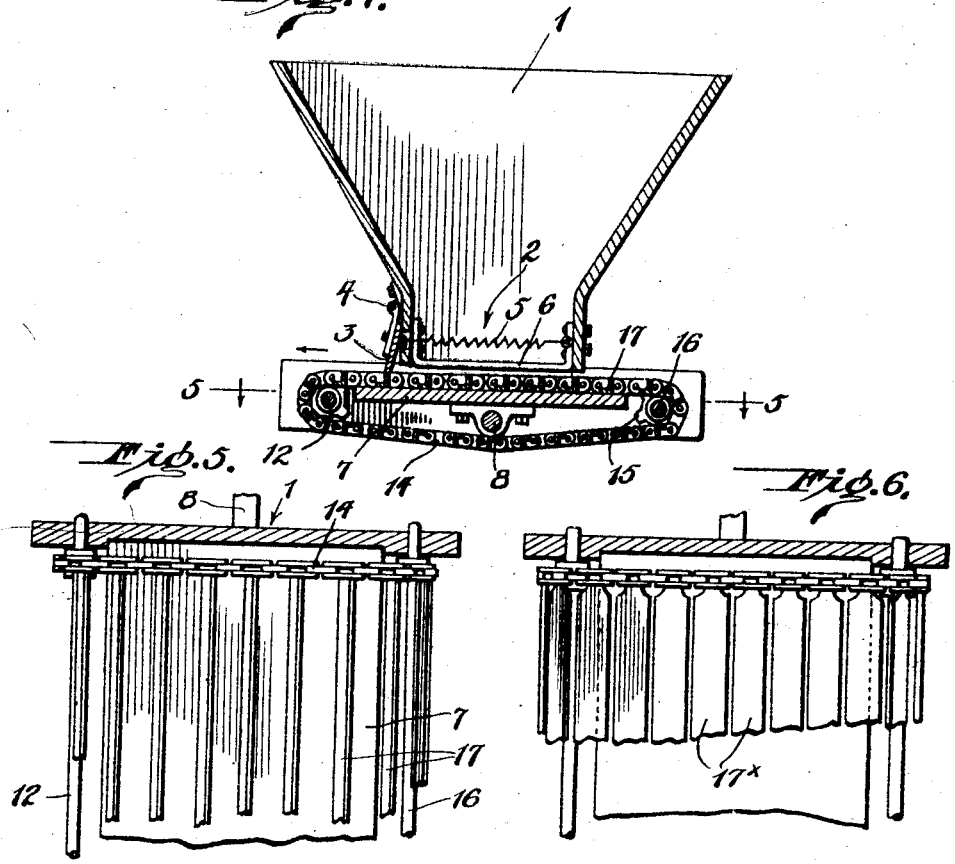
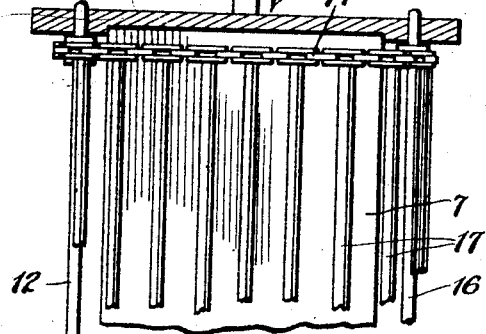
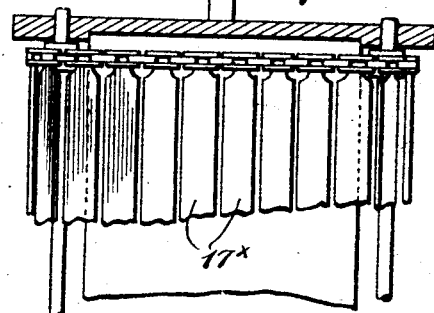
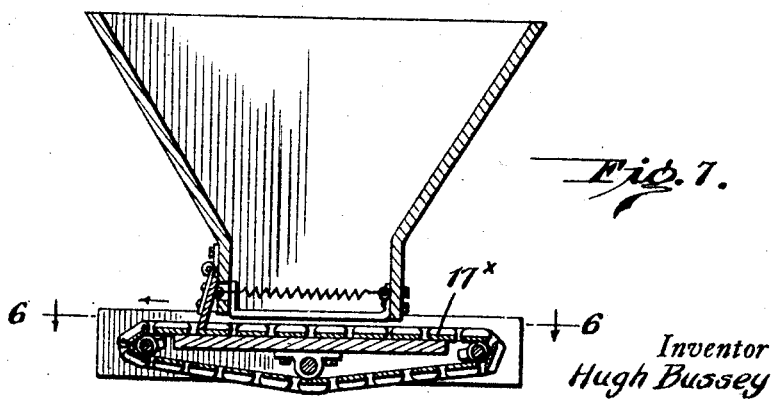
Inventor
Hugh Bussey
By Clarence A. O'Brien
Attorney Patented Aug. 2, 1927.

1,637,601

UNITED STATES PATENT OFFICE.

HUGH BUSSEY, OF EAST ST. LOUIS, ILLINOIS.

SPREADER.

Application filed May 10, 1926. Serial No. 108,025.

My present invention pertains to spreaders; and it has for its object the provision of a wheeled spreader designed more especially for the spreading of ground lime-stone, fertilizer and the like, the spreader being characterized by feed means calculated to efficiently handle wet material to be spread as well as dry material.

Other objects and practical advantages of the invention will be fully understood from the following description and claims when the same are read in connection with the drawings, accompanying and forming part of this specification, in which:—

Figure 4 is a longitudinal vertical section showing the hopper and the discharge means of my improvement.

Figure 5 is a horizontal section taken as indicated by the line 5—5 of Figure 4, looking downwardly.

Figures 6 and 7 are views of a modification hereinafter explicitly referred to.

Similar numerals designate corresponding parts in Figures 1 to 5 to which reference will first be made.

Figure 1:
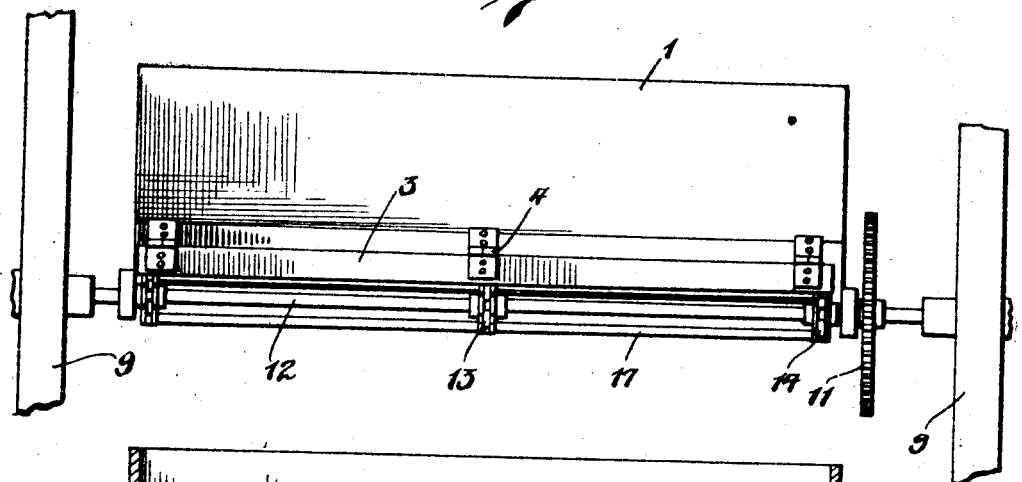
Figure 1 is a front elevation of a wheeled spreader constructed in accordance with my invention.
Figure 2:
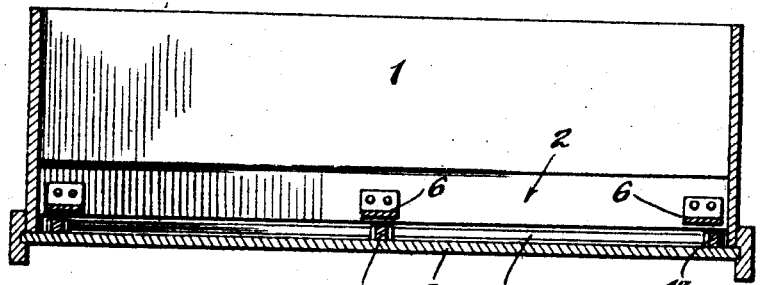
Figure 2 is a vertical section taken through the hopper of the spreader.

Among other elements, my novel spreader designed more especially for distributing ground lime-stone, comprises a hopper 1, preferably about eight feet in length, and having a contracted lower portion 2, open at its lower end, and equipped with an exterior wiping board 3, the said board 3 being hinged at 4 and subject to the action of a retractile spring 5 which serves to yieldingly maintain the board in the position shown in Figure 4. In the lower contracted or throat portion of the hopper 1, I prefer to employ three, more or less, brace bars 6, Figures 2 and 4.

Figure 3:
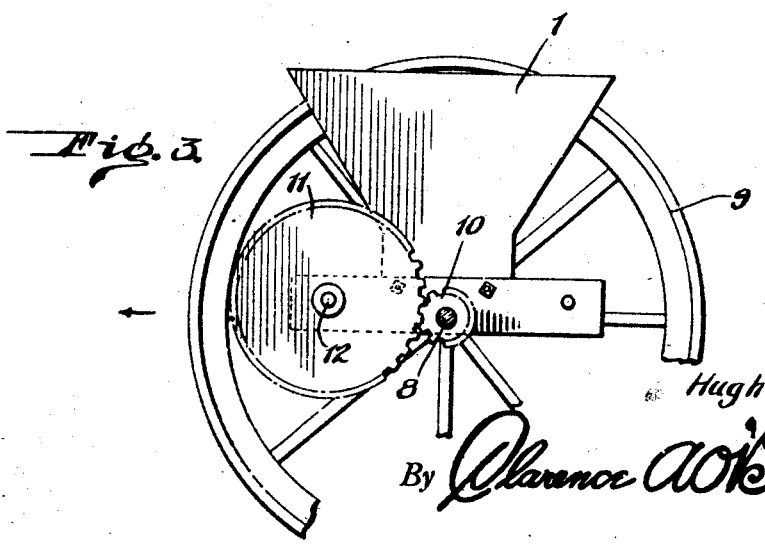
Figure 3 is a broken vertical section taken in the plane at the inner side of one of the wheels of the spreader.

Spaced below the throat of the hopper 1 and appropriately supported is a table 7, and arranged below the said table 7 is the main drive or axle shaft 8 of the spreader, the said shaft 8 being equipped with ground wheels 9 and being also equipped with a spur gear 10, Figure 3. The said spur gear 10 is meshed with a comparatively large gear 11, and the said gear 11 is fixed to a shaft 12 equipped with three spaced sprocket wheels 13 and designed to drive the three sprocket belts 14 of the endless conveyor hereinafter specifically described, the said chains 14 being also carried around sprocket gears or wheels 15 on an idler shaft 16. The upper stretches of the said chain belts 14 are arranged to traverse the table 7 and to move between the upper surface of said table and the lower end of the throat of the hopper 1, and it will be noted by particular reference to Figure 4 that transverse material carriers 17, preferably of angle form in vertical section, are interposed between and carried by the chains 14. Manifestly incident to the use of the spreader the hinged wiping board 3 will rise against the action of the spring 5 to permit stones and the like to pass away from the hopper, and subsequently to the said discharge of a stone or the like the spring 5 will yieldingly maintain the board 3 in the position illustrated so as to enable the said wiping board to regulate the discharge of the material that is being spread.

It will be apparent from the foregoing that incident to the movement of the spreader over a field, the endless conveyor will be moved in the manner stated and in cooperation with the board 3 will operate to evenly discharge and distribute ground lime stone, material of manure character, or any other material that it may be desirable to distribute over the field traversed.

In Figures 6 and 7, Figure 6 being a horizontal section taken in the plane indicated by the line 6—6 of Figure 7, I show a modified endless conveyor, the chains of which carry narrow strips $17^x$ of sheet metal, the conveyor including the said strips $17^x$ being advantageous inasmuch as the strips will not permit the material to be spread to drop through the conveyor. The strips $17^x$ may, within the purview of my invention, and preferably are of about the same length as the hopper 1, namely, about eight feet in length.

It will be appreciated from the foregoing that my novel spreader is simple and inexpensive in construction and is well adapted in general to withstand the usage to which apparatus of corresponding character is ordinarily subjected; and it will also be appreciated that characterized as described the spreader will be reliable in operation, and will require but little attention to keep it in working order.

I have specifically described the preferred embodiments of my invention in order to impart an exact understanding of the said embodiments in all of their details. I do not desire, however, to be understood as limiting myself to the precise constructions disclosed, my invention being defined by my appended claim within the scope of which modifications may be made without departure from my invention.

Having described my invention, what I claim and desire to secure by Letters-Patent, is:—

In a spreader and in combination, an axle shaft, shafts spaced at opposite sides of the axle shaft, and equipped with sprocket gears, a horizontal table mounted directly on the axle shaft, a hopper spaced above said table, sprocket belts mounted on the sprocket gears and having horizontal upper stretches disposed between the table and the discharge end of the hopper, transverse blades carried by the sprocket chains and movable over the table, and forming with the said belts an endless conveyor, a swingable wiping board hinged at its upper edge to the hopper at the rear side thereof and disposed exteriorly to the hopper and arranged to cooperate with the endless conveyor in preventing too free discharge of material, and a retractile spring yieldingly holding the wiping board to its work, said spring connected to the hopper and extending across the same and also extending through an opening in the rear wall of the hopper.

In testimony whereof I affix my signature.

HUGH BUSSEY.